United States Patent
George

(10) Patent No.: US 7,181,004 B2
(45) Date of Patent: *Feb. 20, 2007

(54) DIRECT DRIVE FOR A SUBSCRIBER LINE DIFFERENTIAL RINGING SIGNAL HAVING A DC OFFSET

(75) Inventor: Scott A. George, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 573 days.

This patent is subject to a terminal disclaimer.

(21) Appl. No.: 10/666,544

(22) Filed: Sep. 19, 2003

(65) Prior Publication Data

US 2005/0063534 A1    Mar. 24, 2005

(51) Int. Cl.
*H04M 3/00* (2006.01)
(52) U.S. Cl. .................. 379/418; 379/31; 379/77; 379/88.24; 379/361
(58) Field of Classification Search ................ 379/382, 379/418, 413–413.01; 330/251–261; 340/384.1
See application file for complete search history.

(56) References Cited

U.S. PATENT DOCUMENTS 6,735,302 B1 * 5/2004 Caine et al. ................ 379/405

2004/0174992 A1 * 9/2004 Apfel ......................... 379/413

OTHER PUBLICATIONS

LEGERITY , 2002, "VOICECHIP Le9502", Legerity, Inc. 2002, Austin, Texas; www.legerity.com.*

* cited by examiner

*Primary Examiner*—Fan Tsang
*Assistant Examiner*—Ramnandan Singh
(74) *Attorney, Agent, or Firm*—Davis & Associates; William D. Davis

(57) ABSTRACT

A method of generating a subscriber line differential ringing signal with a DC component includes providing a time-varying supply level, W(t), having a plurality of non-equidistantly spaced critical points along a folding line. W(t) is coupled to the tip line while coupling an alternate source to the ring line in response to a first critical point. W(t) is coupled to the ring line while coupling the alternate source to the tip line in response to a second critical point. An apparatus for generating the ringing signal includes a power supply providing a supply level W(t)=|f(t)−C|+C+D, wherein D is a power supply offset, wherein C≠0. When W(t)≦K a signal processor controls a linefeed driver to toggle between 1) coupling W(t) to the tip line while coupling the ring line to an alternate supply, $V_{ALT}(t)$, and 2) coupling W(t) to the ring line while coupling the tip line to $V_{ALT}(t)$, wherein K is a pre-determined switching threshold.

29 Claims, 14 Drawing Sheets

US 7,181,004 B2

DIRECT DRIVE FOR A SUBSCRIBER LINE DIFFERENTIAL RINGING SIGNAL HAVING A DC OFFSET

FIELD OF THE INVENTION

This invention relates to the field of telecommunications. In particular, this invention is drawn to subscriber line interface circuitry.

BACKGROUND OF THE INVENTION

Subscriber line interface circuits are typically found in the central office exchange of a telecommunications network. A subscriber line interface circuit (SLIC) provides a communications interface between the digital switching network of a central office and an analog subscriber line. The subscriber line comprises a tip line and a ring line. The analog subscriber line connects the SLIC to a subscriber station or subscriber equipment such as a telephone at a location remote from the central office exchange.

In conjunction with the subscriber equipment, the tip and ring lines form a subscriber loop. The SLIC communicates both data and control signals with the subscriber equipment. Control signals tend to require significantly greater voltages and currents than data signals (i.e., voiceband data) on the subscriber loop.

One subscriber equipment control signal requiring relatively high voltages and current is a ringing signal. Typically, the SLIC provides a sinusoidal or trapezoidal ringing signal to the subscriber equipment. Various approaches to ringing signal generation include unbalanced and balanced ringing.

Unbalanced ringing is accomplished by holding one of the tip and ring lines at a pre-determined voltage level (e.g., ground) while providing the other line with the ringing signal. One disadvantage of unbalanced ringing is that the maximum DC operating voltage for the SLIC must be the greater of: i) any DC offset plus the peak ringing voltage, or ii) the peak-to-peak ringing voltage. Such voltage levels tend to limit fabrication of a ringing signal generator to either high voltage integrated circuits or discrete components.

Balanced ringing provides a ringing signal to each of the tip and ring lines. Typically the AC component of the ringing signal applied to both lines is identical with the exception of a 180° phase shift. As a result, balanced ringing requires a significantly lower DC operating voltage than unbalanced ringing. One disadvantage of traditional balanced ringing is that AC matched ringing signals with a relative phase shift of 180° must be generated.

SUMMARY OF THE INVENTION

In view of limitations of known systems and methods, a method of generating a subscriber line ringing signal having a DC offset are provided.

A method of generating a differential ringing signal with a DC component between a tip and a ring line of a subscriber line includes the step of providing a time-varying supply level, W(t), having a plurality of critical points along a folding line, wherein the critical points are substantially not equidistant. W(t) is coupled to the tip line while coupling an alternate source to the ring line in response to a first critical point. W(t) is coupled to the ring line while coupling the alternate source to the tip line in response to a second critical point.

An apparatus for generating a subscriber line ringing signal includes a signal processor, a linefeed driver, and a power supply providing a time-varying supply level $W(t) = |f(t) - C| + C + D$, wherein D is a power supply offset, wherein $C \neq 0$. When $W(t) \leq K$ a signal processor controls a linefeed driver to toggle between 1) coupling W(t) to a tip line while coupling a ring line to an alternate supply, $V_{ALT}(t)$, and 2) coupling W(t) to the ring line while coupling the tip line to $V_{ALT}(t)$, wherein K is a pre-determined switching threshold.

In various embodiments, the differential ringing signal resembles a trapezoidal or a sinusoidal waveform and W(t) resembles one of a full-wave rectified sinusoidal or trapezoidal waveform.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
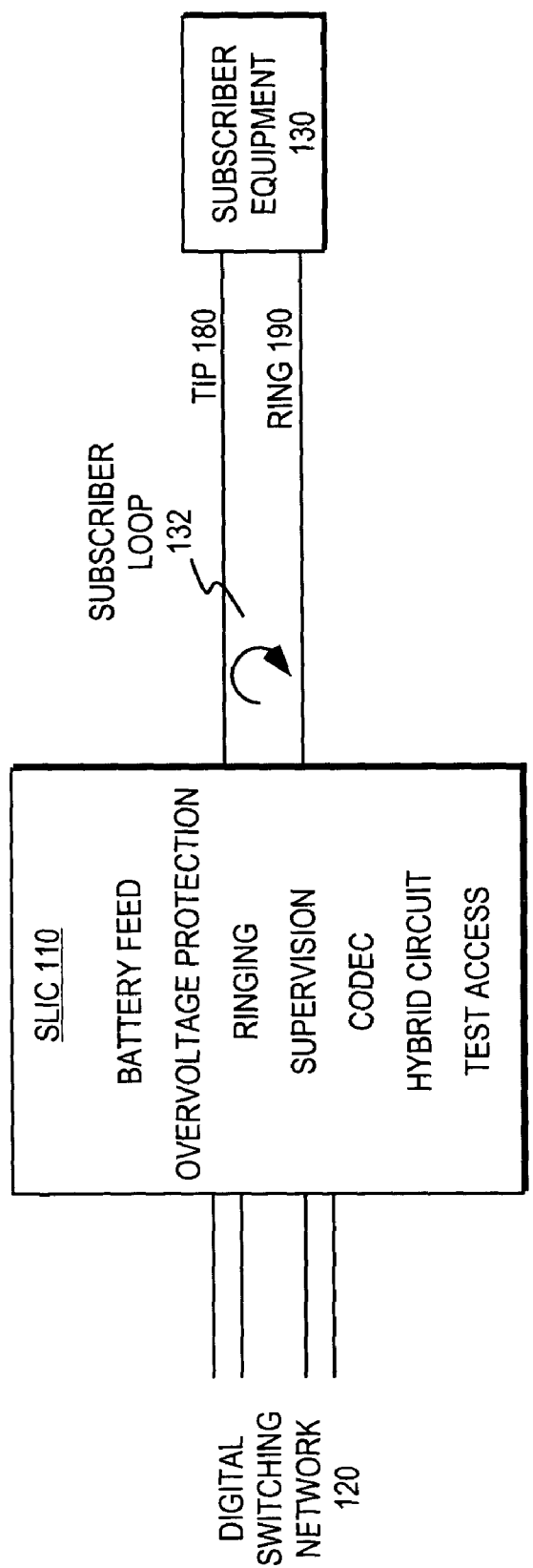
FIG. 1 illustrates one embodiment of a central office exchange including a subscriber line interface circuit (SLIC) coupling subscriber equipment to a digital switching system network.

FIG. 1 illustrates functional elements or one embodiment of a subscriber line interface circuit (SLIC) 110 typically associated with plain old telephone services (POTS) telephone lines. The subscriber line interface circuit (SLIC)

provides an interface between the digital switching network 120 of a local telephone company central exchange and a subscriber loop 132 including subscriber equipment 130.

The subscriber loop 132 is typically used for communicating analog data signals (e.g., voiceband communications) as well as subscriber loop "handshaking" or control signals. The analog data signals are typically on the order of 1 volt peak-to-peak (i.e., "small signal"). The subscriber loop control signals typically consist of a 48 V DC offset and an AC signal of 40–140 Vrms (i.e., "large signal"). The subscriber loop state is often specified in terms of the tip 180 and ring 190 lines of the subscriber loop.

The SLIC is expected to perform a number of functions often collectively referred to as the BORSCHT requirements. BORSCHT is an acronym for "battery feed," "overvoltage protection," "ring," "supervision," "codec," "hybrid," and "test."

The SLIC provides power to the subscriber equipment 130 using the battery feed function. The overvoltage protection function serves to protect the central office circuitry against voltage transients that may occur on the subscriber loop 132. The ring function enables the SLIC to signal the subscriber equipment 130. In one embodiment, subscriber equipment 130 is a telephone. Thus, the ring function enables the SLIC to ring the telephone.

The supervision function enables the SLIC to detect service requests such as when the caller places the subscriber equipment off-hook to initiate or receive a call. The supervision function is also used to supervise calls in progress and to detect dialing input signals.

The hybrid function provides a conversion from two-wire signaling to four-wire signaling. The SLIC includes a codec to convert the four-wire analog voiceband data signal into serial digital codes suitable for transmission by the digital switching network 120. In one embodiment, pulse code modulation is used to encode the voiceband data. The SLIC also typically provides a means to test for or to indicate faults that may exist in the subscriber loop or the SLIC itself.

The codec function has relatively low power requirements and can be implemented in a low voltage integrated circuit operating in the range of approximately 5 volts or less. The battery feed and supervision circuitry typically operate in the range of 40–75 volts. In some implementations the ringing function is handled by the same circuitry as the battery feed and supervision circuitry. In other implementations, the ringing function is performed by higher voltage ringing circuitry (e.g., 75–150 $V_{rms}$). Thus depending upon implementation, the ringing function as well as the overvoltage protection function may be associated with circuitry having greater voltage or current operating requirements than the other circuitry.

Figure 2:
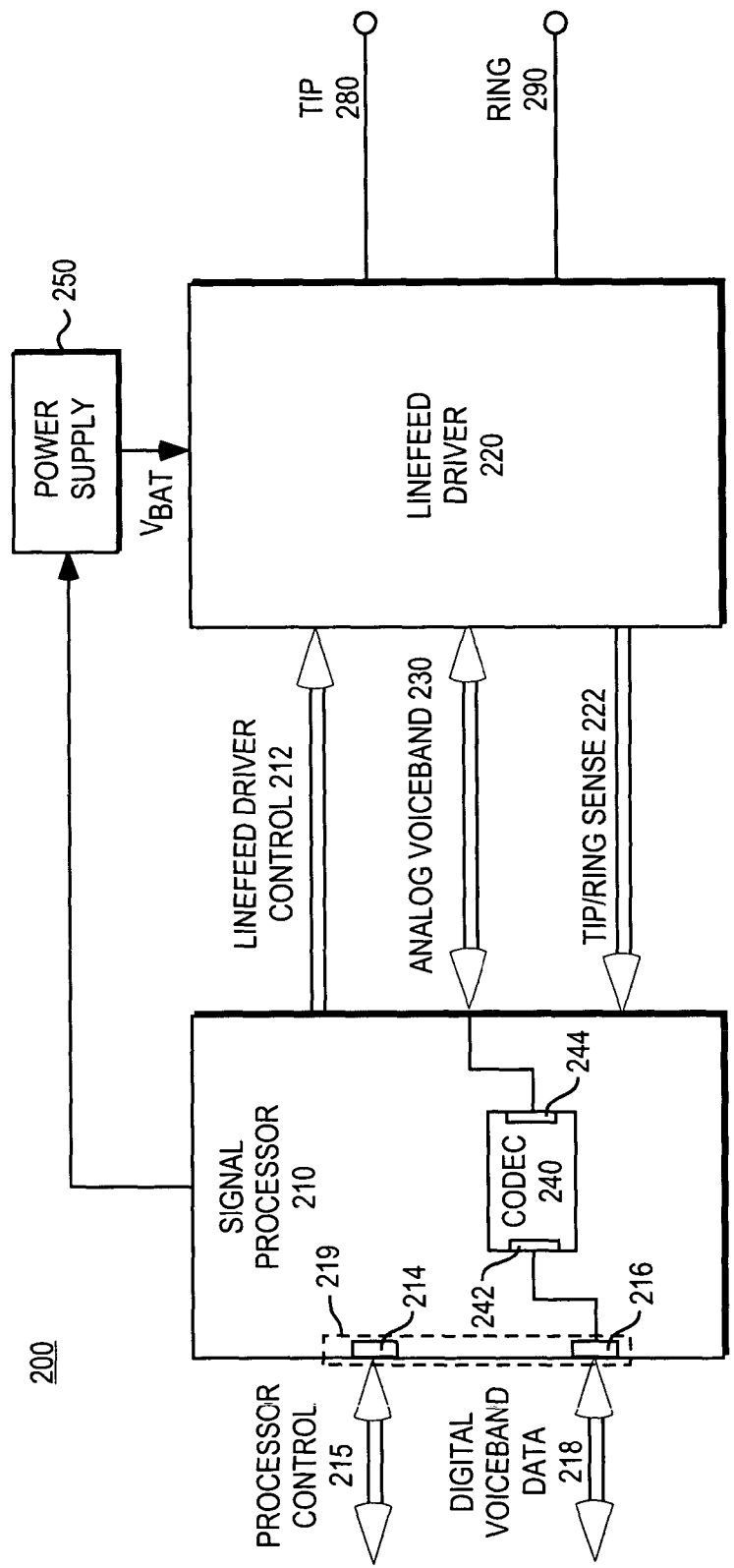
FIG. 2 illustrates one embodiment of a SLIC architecture.

FIG. 2 illustrates one embodiment of a SLIC 200 wherein the BORSCHT functions have been distributed between a signal processor 210 and a linefeed driver 220. Signal processor 210 is responsible for at least the ring control, supervision, codec, and hybrid functions. Signal processor 210 controls and interprets the large signal subscriber loop control signals as well as handling the small signal analog voiceband data and the digital voiceband data.

In one embodiment, signal processor 210 is an integrated circuit. The integrated circuit includes sense inputs for sensing the tip and ring lines of the subscriber loop. The integrated circuit generates subscriber loop linefeed driver control signals in response to the sensed signals. In one embodiment, the linefeed driver does not reside within the integrated circuit or within the same integrated circuit package as the signal processor 210. In alternative embodiments, the signal processor may reside within the same integrated circuit package as at least a portion of the linefeed driver.

Signal processor 210 receives subscriber loop state information from linefeed driver 220 as indicated by tip/ring sense 222. This information is used to generate control signals for linefeed driver 220 as indicated by linefeed driver control 212. The voiceband 230 signal is used for bi-directional communication of the analog voiceband data between linefeed driver 220 and signal processor 210.

Signal processor 210 includes a digital interface 219. The digital interface includes a digital voiceband interface 216 for communicating digital voiceband data 218 between the signal processor and the digital switching network. In one embodiment, the digital interface includes a processor interface 214 to enable programmatic control of the signal processor 210. The processor interface effectively enables providing processor control data 215 to obtain programmatic or dynamic control of battery control, battery feed state control, voiceband data amplification and level shifting, longitudinal balance, ringing currents, and other subscriber loop control parameters as well as setting thresholds such as ring trip detection and off-hook detection.

The digital voiceband data 218 is coupled to a digital codec interface 242 of signal processor 210 for bi-directional communication of the digital voiceband data between the codec 240 of the signal processor and the digital switching network. The analog voiceband data 230 is coupled to an analog codec interface 244 of signal processor 210 for bi-directional communication of the analog voiceband data between the codec and the linefeed driver.

Linefeed driver 220 maintains responsibility for battery feed to tip 280 and ring 290. Overvoltage protection is not explicitly illustrated. Overvoltage protection can be provided by fuses incorporated into linefeed driver 220, if desired. Linefeed driver 220 includes sense circuitry to provide signal processor 210 with sensed subscriber loop operating parameters as indicated by tip/ring sense 222. Signal processor 210 performs any necessary processing on the sensed parameters in order to determine the operational state of the subscriber loop. For example, differences or sums of sensed voltages and currents are performed as necessary by signal processor 210 rather than linefeed driver 220. Thus common mode and differential mode components (e.g., voltage and current) of the subscriber loop are calculated by the signal processor rather than the linefeed driver.

Linefeed driver 220 modifies the large signal tip and ring operating conditions in response to linefeed driver control 212 provided by signal processor 210. This arrangement enables the signal processor to perform processing as needed to handle the majority of the BORSCHT functions. For example, the supervisory functions of ring trip, ground key, and off-hook detection can be determined by signal processor 210 based on operating parameters provided by tip/ring sense 222.

Power supply 250 provides the voltage $V_{BAT}$ to the linefeed driver for driving the tip and ring lines. In one embodiment, power supply 250 is a switching power supply controlled by signal processor 210 to provide the appropriate DC output voltage.

The tip and ring lines form a differential pair for communicating voiceband and handshaking signals to the subscriber equipment. Ringing of the subscriber equipment is accomplished using a differential ringing signal applied to the tip and ring lines. The differential ringing signal is thus composed of a ringing signal component applied to the tip line and a ringing signal component applied to the ring line.

The differential ringing signal is classified as "unbalanced" or "balanced" depending upon the characteristics of the ringing signal components.

The differential ringing signal components may be described in terms of time varying currents or time varying voltages. For purposes of illustration, a level of abstraction regarding the assignment of these components to the tip or ring lines is introduced. Namely, the examples refer to a first line ringing signal component L1(t) and a second line ringing signal component L2(t), rather than a tip or ring line ringing signal component. The assignment of L1(t) and L2(t) to tip and ring lines depends upon the desired polarity or phase for the differential ringing signal.

Figure 3:
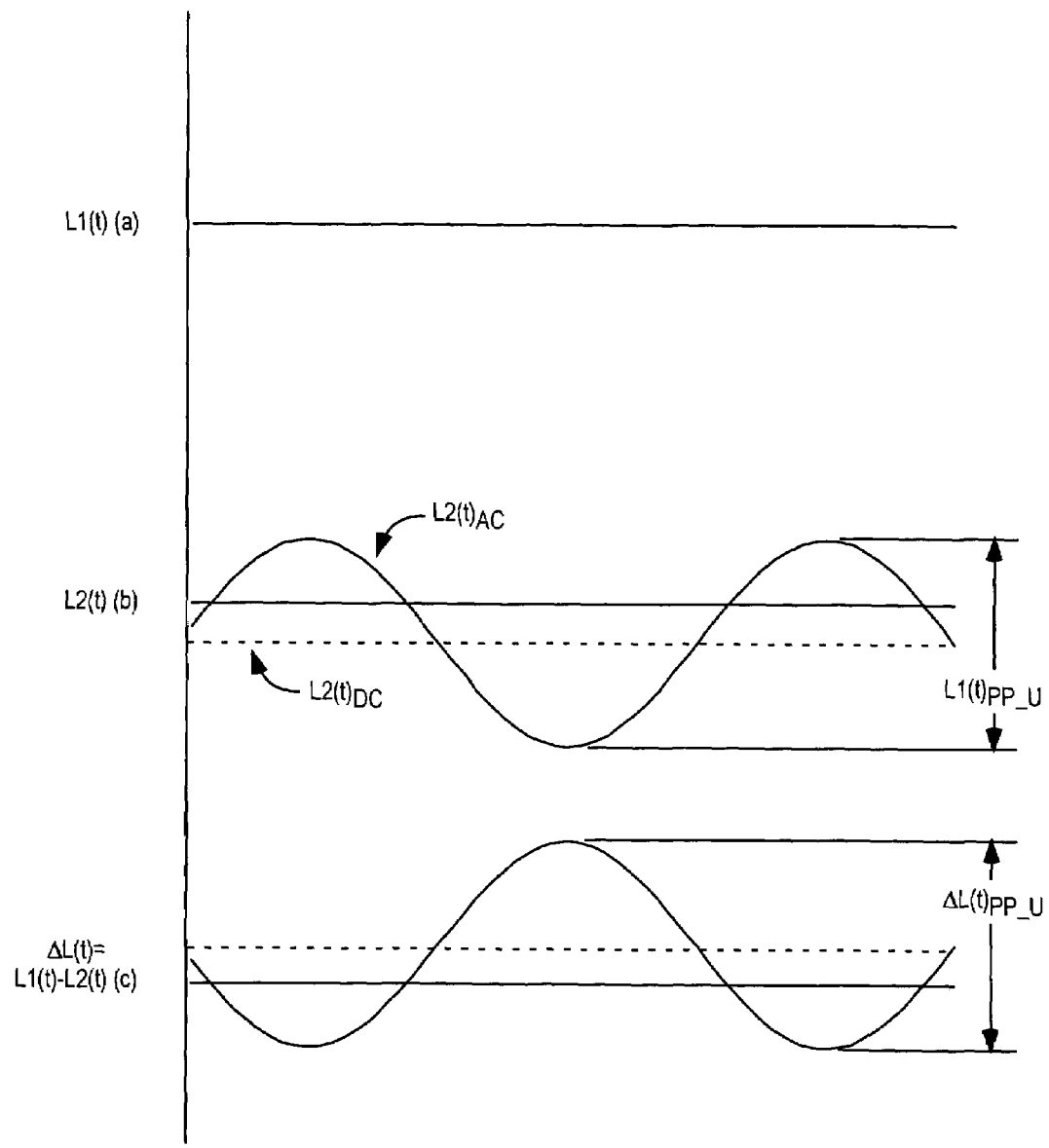
FIG. 3 illustrates one embodiment of ringing signal components for generation of an unbalanced differential ringing signal.

FIG. 3 illustrates embodiments of subscriber line waveforms for unbalanced ringing. Waveform 3(a) represents the first line voltage, L1(t). Waveform 3(b) represents the second line voltage, L2(t). Waveform 3(c) represents the difference ΔL(t)=L1(t)−L2(t) between the first and second lines.

The first line is set to a pre-determined level such that L1(t) is constant. In the illustrated embodiment, the first line is coupled to a ground node such that L1(t)=0 as indicated. The second line has an AC component and an optional DC component. For example, if L2(t)=−48+127 sin(ωt), the DC component is −48 and the AC component is 127 sin(ωt). The differential ringing signal is L1(t)−L2(t)=48−127 sin(ωt) as indicated in waveform 3(c).

The second line peak-to-peak voltage (L2(t)$_{PP\_U}$) is the same as the differential peak-to-peak voltage (ΔL(t)$_{PP\_U}$) between tip and ring such that the entire differential ringing signal swing is carried on only one line. Unbalanced ringing is thus characterized by using only one of the tip and ring lines to carry the entire signal swing.

In contrast, "balanced ringing" implies applying matched AC signals (with a relative phase difference) to the tip and ring lines such that each line is responsible for half the swing range of the resulting differential ringing signal. Traditionally, the individual line ringing signal components have the property that L1(t)=−L2(t) such that the common mode component is zero $$(\text{i.e.,} \frac{L1(t) + L2(t)}{2} = 0).$$

Typically, L1(t) and L2(t) are periodic and exhibit the properties $$\int_0^T L1(t) - \frac{1}{T}\int_0^T L1(t) = 0$$

and $$\int_0^T L2(t) - \frac{1}{T}\int_0^T L2(t) = 0$$

over the period T, where $$\frac{1}{T}\int_0^T L1(t), \frac{1}{T}\int_0^T L2(t)$$

represent the mean or DC components of L1(t) and L2(t).

Figure 4:
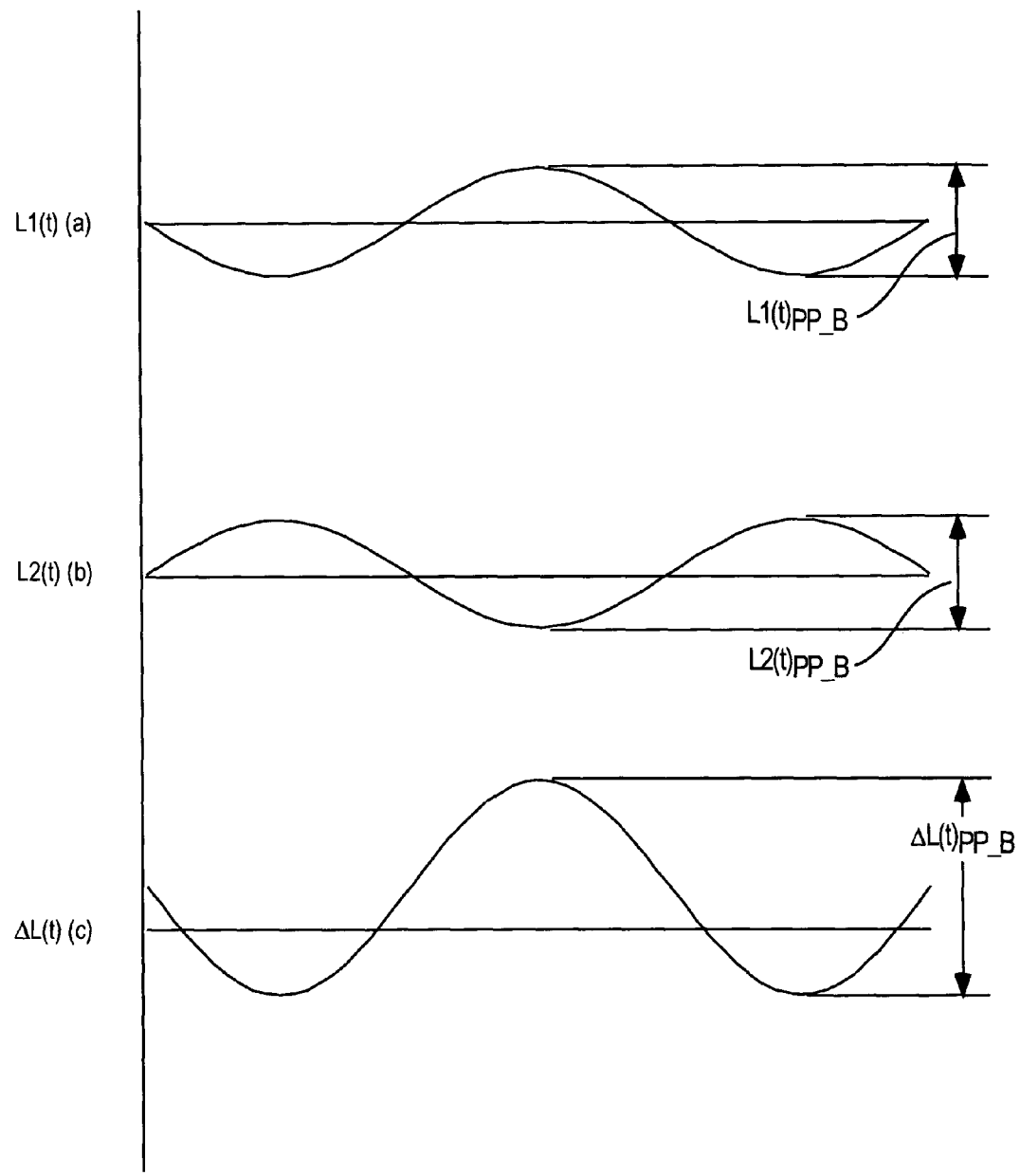
FIG. 4 illustrates one embodiment of ringing signal components for generation of a balanced differential ringing signal.

FIG. 4 illustrates subscriber line waveforms for balanced ringing. The tip and ring lines have the same AC component with a relative phase shift of 180°. Waveform 4(a) represents the first line ringing signal component, L1(t)=63.5 sin(ωt). Waveform 4(b) represents the second line ringing signal component, L2(t)=63.5 sin(ωt+π) such that the AC components of the tip and ring lines are phase shifted 180° relative to each other. Waveform 4(c) represents the differential ringing signal, ΔL(t)=L1(t)−L2(t). Substituting the ringing signal component values yields ΔL(t)=63.5 sin(ωt)−63.5(ωt+π). Given that sin(ωt+π)=−sin(ωt), the expression can be simplified to ΔL(t)=127(ωt).

Comparing FIGS. 3 and 4, the AC component of ΔL(t) is the same for balanced and unbalanced ringing such that the resulting peak-to-peak ringing signal provided to the subscriber equipment is the same (ΔL(t)$_{PP\_U}$=ΔL(t)$_{PP\_B}$). The maximum peak-to-peak value of any ringing signal component contributing to a balanced differential ringing signal, however, needs only to be half of the maximum peak-to-peak value of any ringing signal component contributing to an unbalanced differential ringing signal (i.e., L1(t)$_{PP\_B}$=L2(t)$_{PP\_B}$=½L2(t)$_{PP\_U}$).

Thus, a signal of only half the swing required for unbalanced ringing can be used on each of the tip and ring lines for balanced ringing. The disadvantage of balanced ringing, however, is that AC matched ringing signals with a 180° phase difference must be generated.

Figure 5:
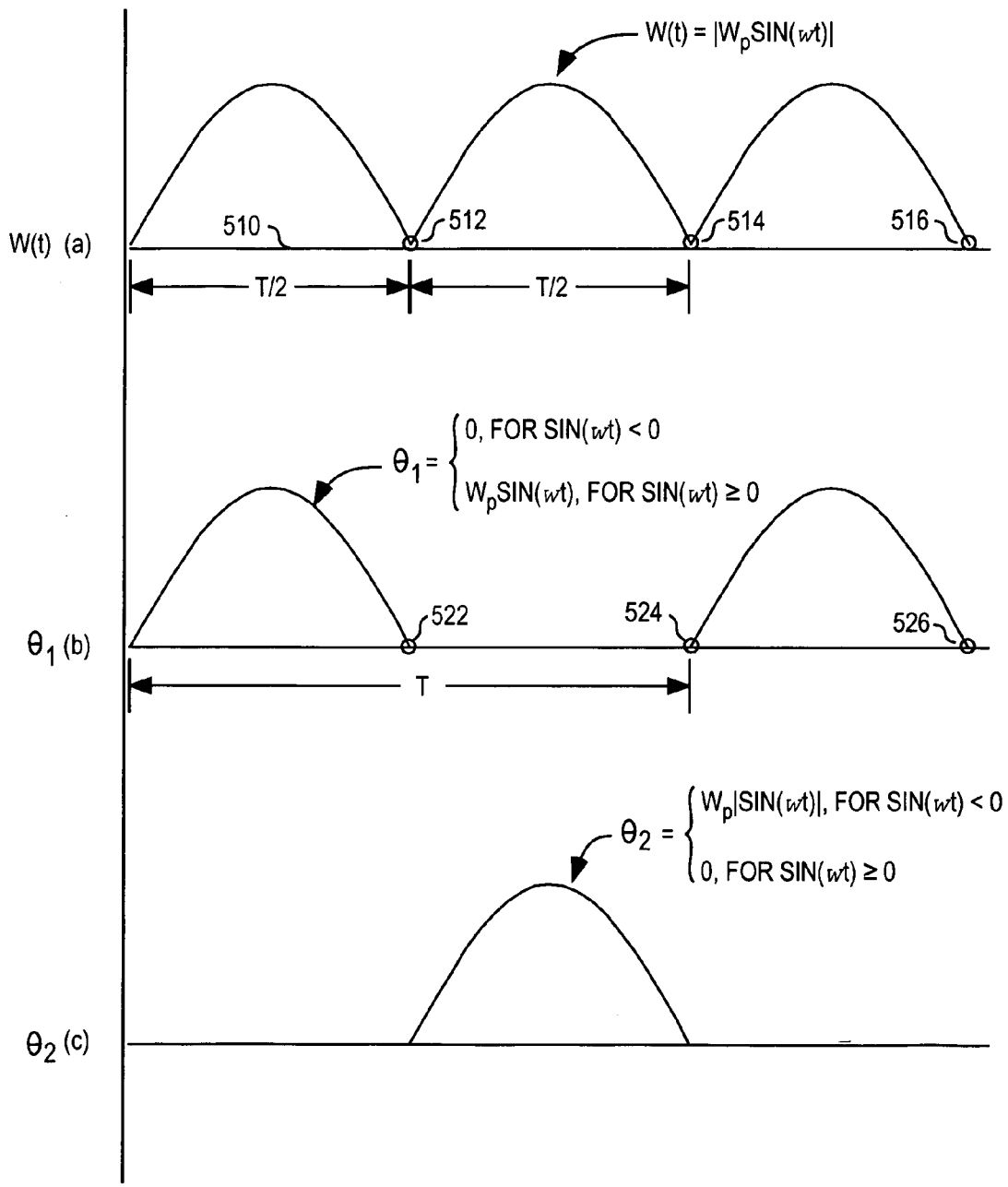
FIG. 5 illustrates one embodiment of a rectified waveform and decomposition of the rectified waveform into matched ringing signal components with a 180° relative phase difference.

FIG. 5 illustrates an alternate waveform 5(a) from which individual ringing signal components of the differential ringing signal can be extracted. Alternative waveform 5(a) is a full-wave rectified sinusoid. In the illustrated embodiment, the rectified sinusoid corresponds to a sinusoid of period T folded in half about a folding point defined by the mean of the sinusoid. If there is no DC offset, W=|W$_p$ sin(ωt)|. The period of the resulting waveform is T/2. The full-wave rectified sinusoid is equivalent to the sum of two half-wave rectified sinusoids θ$_1$, θ$_2$ that are 180° phase shifted from each other as indicated in waveforms (b) and (c). The period of waveforms (b) and (c) is T.

Figure 6:
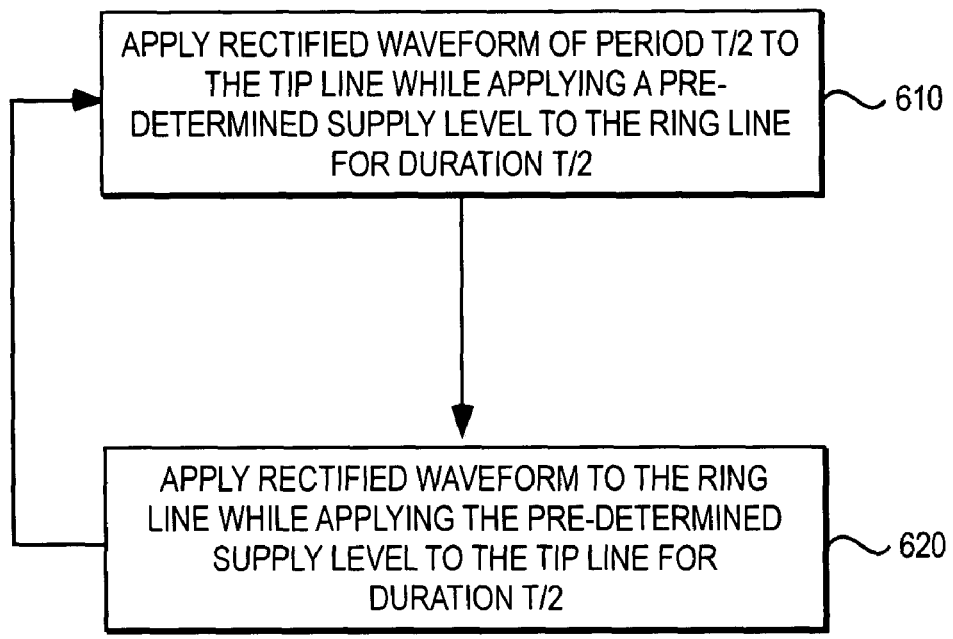
FIG. 6 illustrates one embodiment of a method for generating matched ringing signal components with a 180° phase difference.

FIG. 6 illustrates one method of generating a differential ringing signal from a rectified or folded waveform. In step 610, a rectified waveform of period T/2 is applied to the tip line while the ring line is maintained at a pre-determined supply level for the duration T/2. In step 620, the rectified waveform is applied to the ring line while the tip line is maintained at a pre-determined supply level for the duration T/2. Each line thus alternately receives a time varying waveform for a duration T/2 and a pre-determined supply level for the duration T/2. The process is repeated for the duration of ringing by toggling application of the rectified waveform between a selected one of the tip and ring lines while holding the other line at the pre-determined supply level.

In one embodiment, the pre-determined supply level is ground (e.g., approximately 0 volts). In one embodiment, the rectified waveform is a full-wave rectified sinusoid. Alternatively, the rectified waveform is a trapezoidal waveform.

Referring to FIG. 5, rectified waveforms such as 5(a) (full-wave) or 5(b) (half-wave) are characterized by a plurality of critical points that lie on a folding line. A critical point for a waveform, W(t), exists everywhere W(t) is not differentiable as well as where the first derivative of W(t) is zero (i.e., d/dtW(t)=0 or d/dtW(t) does not exist). For example, waveform 5(a) has critical points including 512, 514, and 516. Waveform 5(b) has critical points at 522, 524, and 526. In one embodiment, the toggling occurs at or near the critical points of the rectified waveform.

Given that the critical points are closer to the folding point than the remainder of the waveform, a threshold detector may be used to identify critical points and determine when to toggle. Thus toggling occurs when the rectified waveform falls below a pre-determined switching threshold, K. The threshold detector may be used in conjunction with a differentiator or other mechanism to ensure that toggling occurs only once for each critical point.

Figure 7:
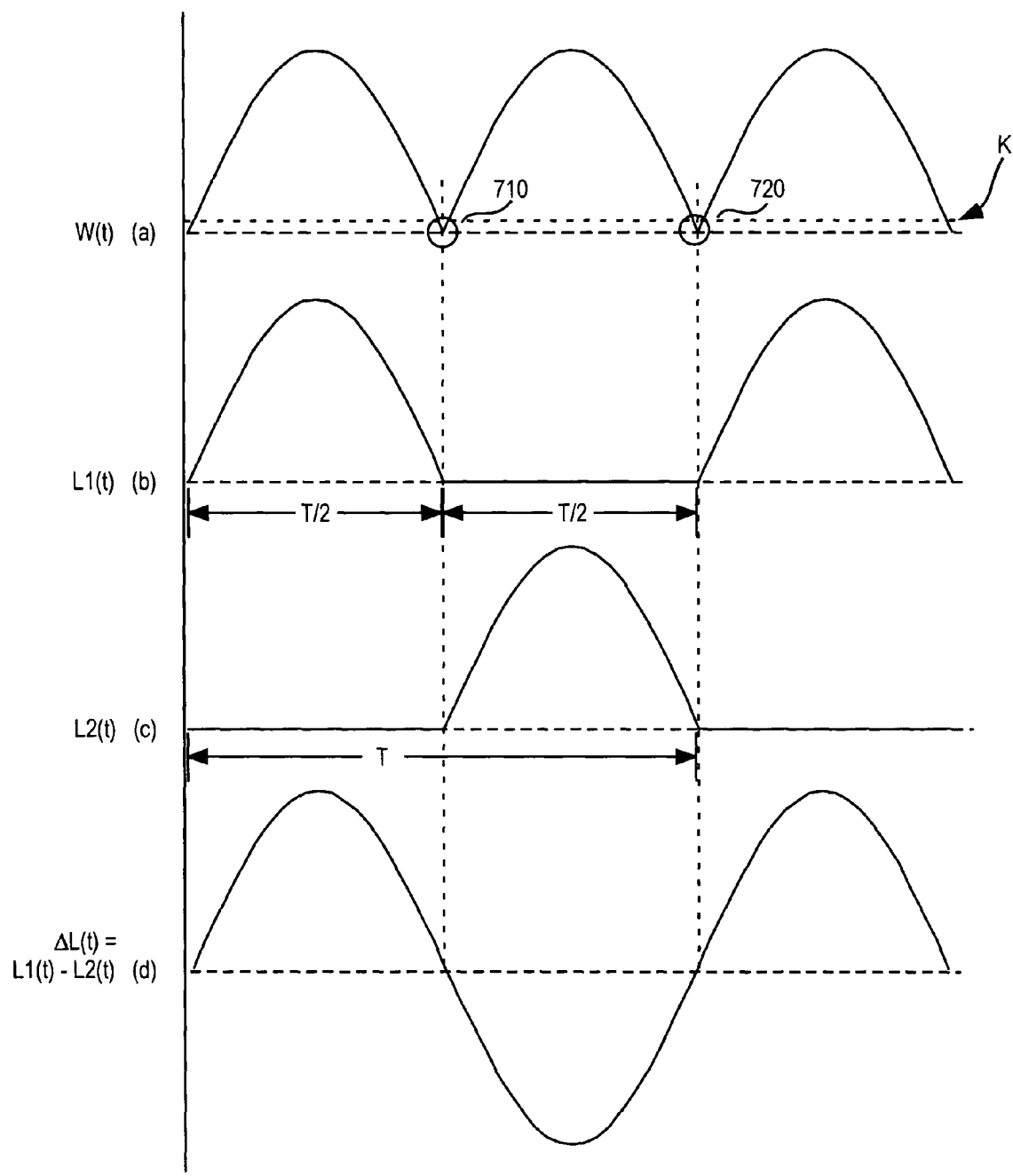
FIG. 7 illustrates application of the method of FIG. 6 to one embodiment of a rectified waveform for generating the differential ringing signal.

FIG. 7 illustrates the application of the method of FIG. 6 to first and second lines of a subscriber line comprising tip and ring lines. Waveform 7(*a*) (W(t)) resembles a full-wave rectified sine wave. W(t) is applied to the first line while holding the second line at a pre-determined supply level of 0 volts (i.e., ground). When W(t) approaches critical point 710 near zero, a toggling of the application of W(t) and the pre-determined supply level occurs. In particular, W(t) is now applied to the second line while the first line is grounded. When W(t) subsequently approaches critical point 720, another toggling occurs. In particular, W(t) is applied to the first line while the second line is grounded.

Waveforms 7(*b*) and 7(*c*) represent the first (L1(t)) and second (L2(t)) line signals generated as a result of the toggling. The resulting first and second line signals approximate half-wave rectified sinusoids in the illustrated embodiment. The resulting differential ringing signal ΔL(t)=L1(t)−L2(t) is illustrated as waveform 7(*d*). The frequency of the differential ringing signal ΔL(t) is one-half that of W(t) in the illustrated embodiment. In one embodiment, the differential ringing signal ΔL(t) has substantially no DC component.

The AC components of L1(t) and L2(t) are identical with the exception of a relative 180° phase shift. Thus the amplitude of the AC portion of the ringing signal component applied to each line need only be half that required of an unbalanced ringing signal to achieve the same differential result. Moreover, waveforms (b) and (c) were readily extracted from waveform (a) rather than being independently generated such that the difficulties of generating identical sinusoids or other waveforms 180° out of phase is substantially avoided.

In the illustrated embodiment, L2(t)=L1(t+T/2) where T is the period of both L1(t) and L2(t). At least one of the ringing signal components is time varying over the interval between any two critical points. Thus for t∈(0, T/2) there is some point t=z for which the derivative of at least one of L1(t) and L2(t) is non-zero. In other words, there exists some z∈(0, T/2) such that either $$\frac{d}{dt}L1(t)\bigg|_{t=z} \neq 0 \text{ or } \frac{d}{dt}L2(t)\bigg|_{t=z} \neq 0.$$

Waveforms such as W(t) are typically already available from an intermediate stage of a SLIC power supply that provides a variable $V_{BAT}$. Some SLIC power supplies generate an appropriate $V_{BAT}$ for the particular operational mode of the SLIC. $V_{BAT}$ may be generated through rectification of an AC signal. Alternatively, $V_{BAT}$ may be generated through processes other than rectification.

A switched mode power supply, for example, may generate a waveform that is filtered to produce a $V_{BAT}$ with substantially no AC component. This DC $V_{BAT}$ is then used to power linear amplifiers to produce the appropriate differential ringing signal. This approach is inefficient, however, due to filter conversion and the power inefficiency of linear amplification. Direct driving of the subscriber line may be achieved by independently driving the tip and ring lines with ringing signal components derived from an existing power supply waveform.

Figure 8:
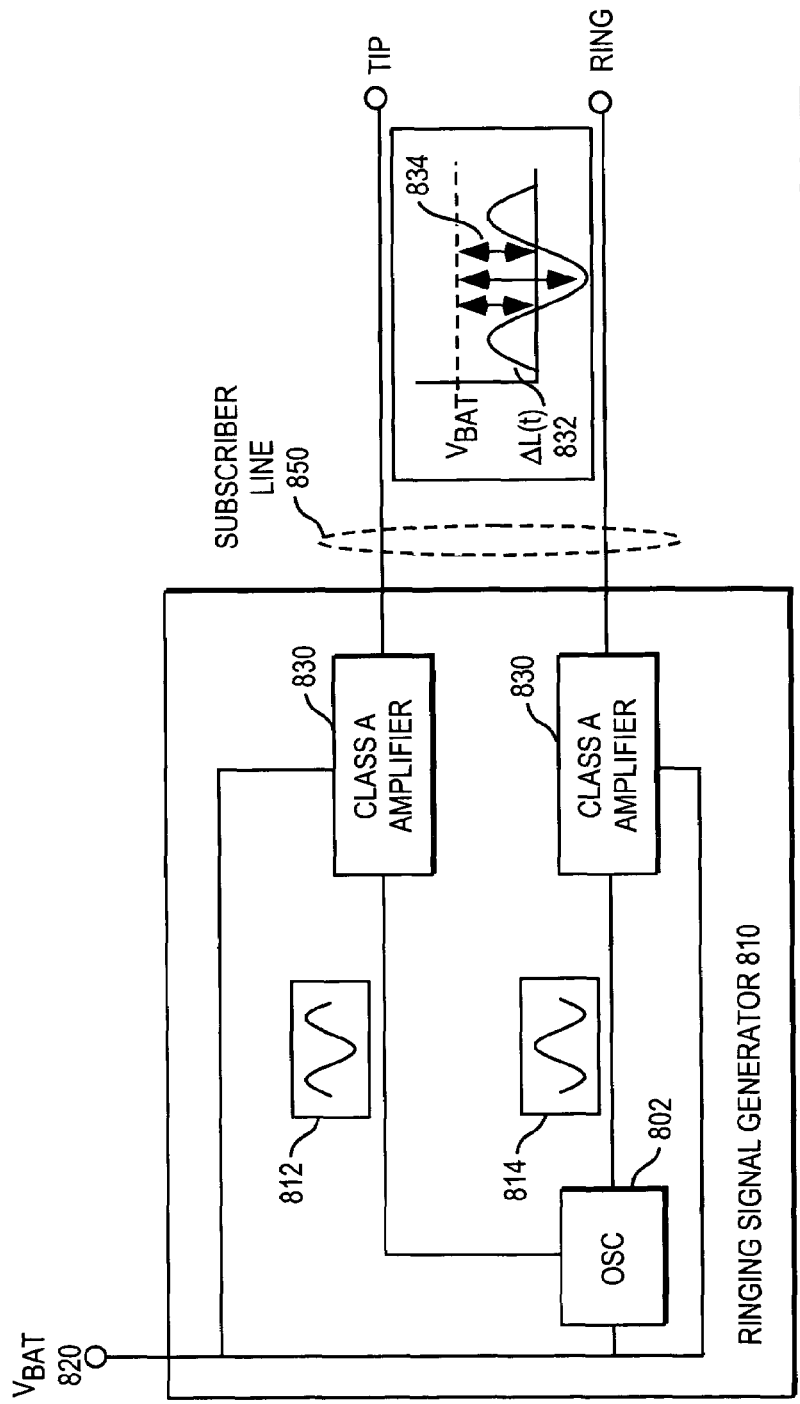
FIG. 8 illustrates prior art generation of a differential ringing signal using linear amplifiers.

FIG. 8 illustrates prior art generation of a ringing signal using linear amplification. Supply voltage $V_{BAT}$ 820 powers ringing signal generator 810. Low power ringing signal components (e.g., sinusoidal waveforms 812, 814 produced by oscillator 802) are applied to each linear amplifier 830. Each linear amplifier produces a high power AC ringing signal component that contributes to the differential ringing signal 832 for driving the subscriber line 850. In the illustrated embodiment, the linear amplifiers 830 are class A amplifiers.

Class A amplifiers are linear amplifiers biased such that the active devices conduct for the full signal swing of the input waveform. Class A amplifiers tend to have relatively high quiescent power consumption and low power efficiency. The area 834 between the supply level and the ringing signal represents power consumed by the linear amplifiers to generate the ringing signal components. This power is effectively wasted.

Some SLIC architectures incorporate a DC-DC converter as the power supply for generation of the appropriate $V_{BAT}$ used to drive the subscriber line (see FIG. 2). The full-wave rectified sinusoidal waveform illustrated as waveform 5(*a*) or a waveform approximating such a full-wave rectified sine wave (without actual rectification) may be provided by the power supply.

Figure 9:
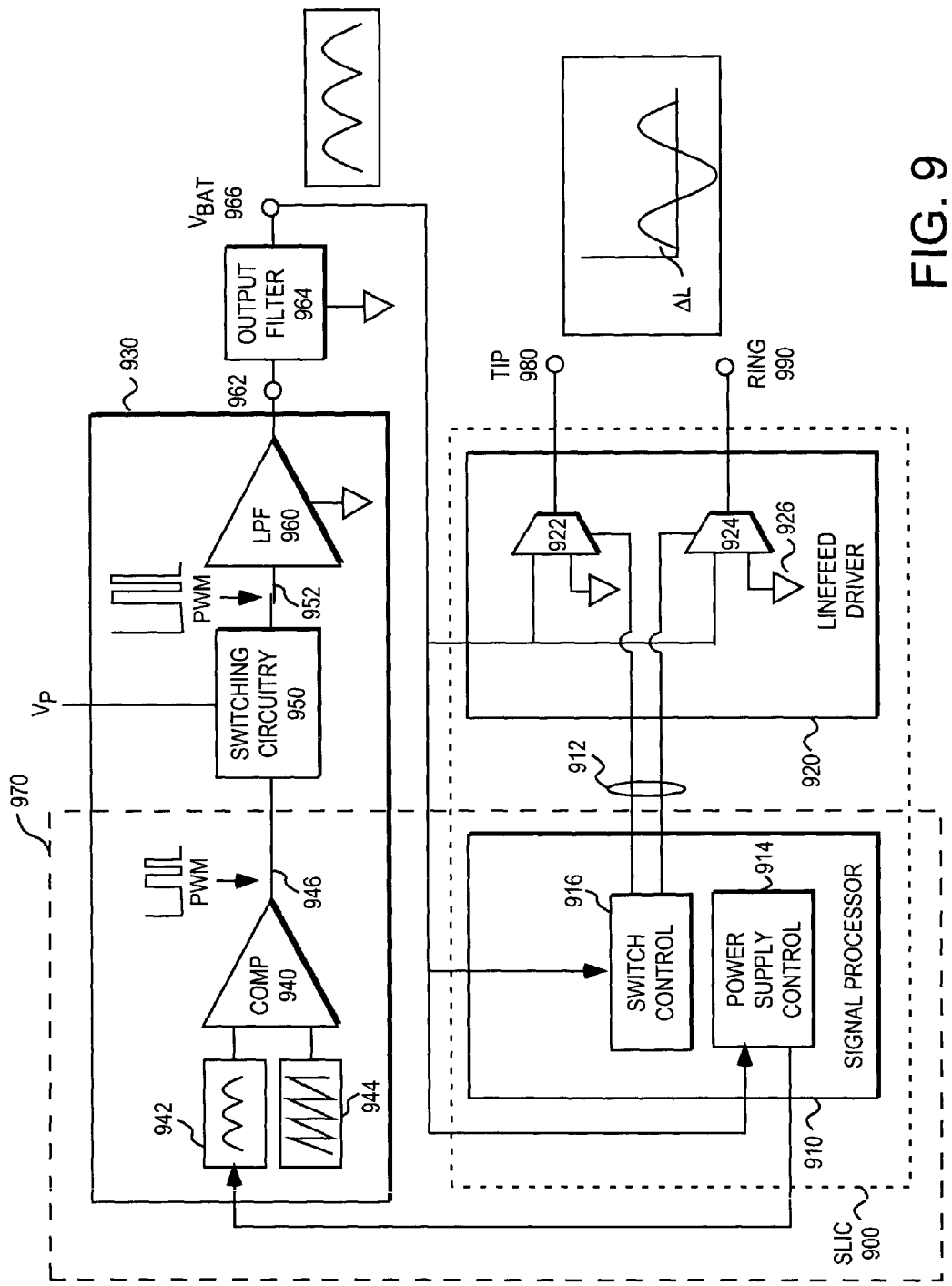
FIG. 9 illustrates one embodiment of an apparatus generating a differential ringing signal through controlled switching.

FIG. 9 illustrates an alternative differential ringing signal generator. Application of the time-varying supply level provided by the power supply is toggled between the tip and ring lines to permit direct driving of the subscriber line from the power supply. The steps of converting the supply level to DC and using the DC supply level to inefficiently linearly amplify ringing signal components is thus eliminated.

SLIC 900 includes signal processor 910 and linefeed driver 920. Signal processor 910 includes a power supply control 914 and a switch control 916. Power supply control 914 provides the appropriate signals to cause the power supply 930 to generate an output waveform suitable for decomposition into the differential ringing signal components.

In one embodiment, the power supply control provides digital values to the power supply 930 and the modulation duty cycle or pulse width of the power supply is varied accordingly. In the illustrated embodiment, power supply control 914 provides a small rectified sinusoidal signal 942 to switching power supply 930. The term "rectified sinusoidal" refers to the appearance of the waveform. Actual generation of the signal 942 may be accomplished through rectification or other methods.

Comparator 940 generates a waveform having its pulse width modulated in accordance with signal 942. In the illustrated embodiment, comparator 940 compares signal 942 with a sawtooth waveform 944 to generate a pulse width modulated signal 946.

The pulse width modulated signal 946 causes switching circuitry 950 to switch a much larger supply level, $V_P$, thus generating an amplified pulse width modulated signal 952 suitable for driving a subscriber line. The amplified pulse width modulated signal 952 is filtered by a low pass filter 960 to produce a filtered output 962 having an output waveform that is substantially similar to the small signal full-wave rectified sinusoid input 942.

The power supply output may be further filtered through an output filter 964 to generate the power supply output, $V_{BAT}$ 966. In one embodiment output filter 964 provides capacitive filtration to regulate the power supply output.

The output of the power supply may be unfiltered during ringing. In one embodiment, the ringing frequency is low enough such that the time constant of the capacitive output filter is incapable of performing any significant regulation near ringing frequencies. Thus as a result of the low ringing frequency, the output of the power supply exhibits a "rectified" waveform rather than a substantially constant supply level even after filtration.

The small signal input 942 is varied to produce the appropriate $V_{BAT}$ for each of the different operational states of the SLIC (e.g., on-hook, off-hook, ringing). The output filter 964 is designed to produce a substantially constant $V_{BAT}$ 966 for higher frequency input signals 942. For input signals having a frequency near the nominal ringing frequency, however, output filter 964 is significantly less effective at regulating the power supply output 966 such that $V_{BAT}$ is an amplified version of the small signal input 942. In one embodiment, the differential ringing frequency is approximately 15–50 Hz.

The power supply output 966 is provided to signal processor 910 and the linefeed driver 920. The signal processor provides linefeed driver control signals 912 to the linefeed driver. In one embodiment, the linefeed driver operates as a linear amplifier when the SLIC is in an off-hook or on-hook operational state. When in the ringing state, the linefeed driver is operated as a plurality of switches. The linefeed driver is thus modeled as a plurality of switches or multiplexers 922, 924 during ringing.

Switch control 916 senses the level of the power supply output 966 and provides the linefeed driver 920 with the appropriate control signals to selectively couple the tip 980 and ring 990 lines to either the power supply or an alternate source. In this case, the alternate source is ground 926 for both tip and ring. In one embodiment, switch control 916 comprises a threshold detector for identifying the proximity of critical points using a threshold value for $V_{BAT}$. Switch control 916 may include additional components such as a differentiator for more accurate toggling of multiplexers 922 and 924.

In the illustrated embodiment, the power supply output is a periodic waveform with a period of T/2 during the ringing state. When the power supply output falls below a pre-determined switching threshold, K, switch control 916 causes tip multiplexer 922 to couple the tip line to the power supply output 966. After a time period of T/2 has elapsed (i.e., the next time the power supply output falls below the pre-determined switching threshold), switch control 916 causes tip multiplexer 922 to couple the tip line to the alternate source (e.g., ground 926). The resulting waveform appearing on the tip line thus has a period of T and substantially resembles a half-wave rectified sinusoid.

The switch control similarly causes the ring multiplexer 924 to switch between the alternate source (e.g., ground 926) and the power supply output 966. The AC components of the resulting waveforms appearing on the tip and ring lines have approximately a 180° relative phase difference. The resulting differential ringing signal (e.g., L1(t)–L2(t)) is substantially sinusoidal and has a period of T (i.e., frequency=1/T).

In one embodiment, the tip and ring multiplexers switch at approximately the same time such that the control signal for one multiplexer is simply an inverted version of the control signal for the other multiplexer. In an alternate embodiment, the multiplexers may be switched at slightly different times for waveform shaping purposes in order to achieve a differential ringing signal that better approximates a sinusoid.

Although there may be some losses within SLIC 900, the linefeed driver multiplexers effectively switch the power supply output 966 to directly drive the subscriber line without intervening linear amplifiers. Accordingly, with the exception of the negligible losses of the SLIC switch control and multiplexers, the efficiency of the ringing signal generation is limited only by the efficiency of the switching power supply 930.

Figure 14:
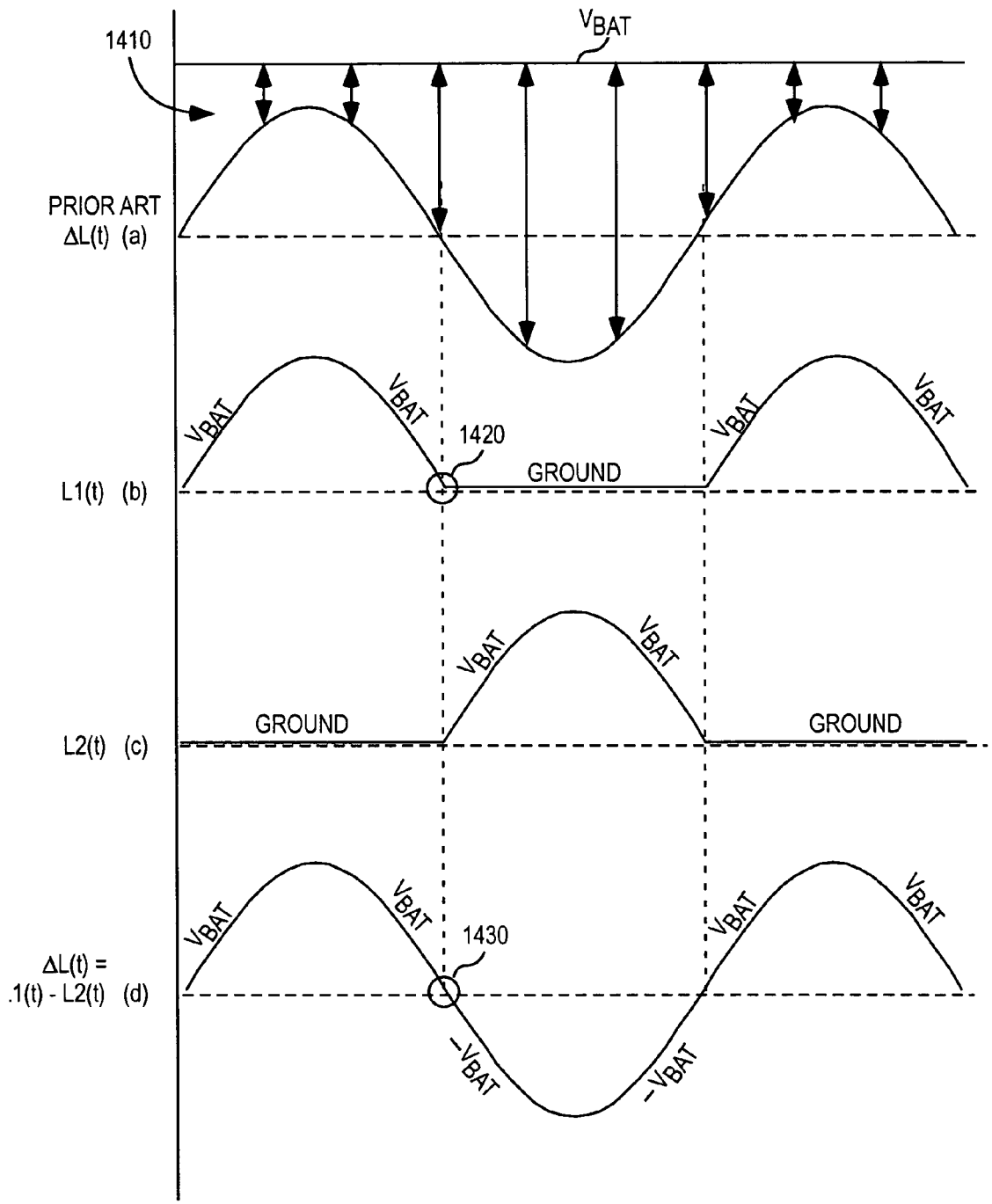
FIG. 14 contrasts generation of a differential ringing signal through an intervening linear amplifier versus direct driving of the subscriber line.

FIG. 14 contrasts the prior art differential ringing signal with the directly driven differential ringing signal. Waveform (a) illustrates the losses (region 1410) attributable to attempting to drive the subscriber line using a fixed $V_{BAT}$ that serves as the amplification power rail when intervening linear amplifiers are used. Waveforms (b) and (c) illustrate the ringing signal components L1(t) and L2(t), respectively, that are derived from $V_{BAT}$ in a direct drive approach as a result of toggling between the power supply and ground at selected switching points (e.g., 1420). Each component is substantially identical to $V_{BAT}$ during alternating switching cycles.

The resulting differential ringing signal illustrated as waveform (d) is similarly identical to $V_{BAT}$ during alternating switching cycles. For every other switching cycle, waveform (d) is identical to $-V_{BAT}$. Given that L2(t)=$V_{BAT}$ during this portion of the switching cycle, it follows that $-L2(t)=-V_{BAT}$. This is a function of the derivation of the differential signal. A separate $-V_{BAT}$ is obviously not required. The $-V_{BAT}$ appearing in the differential ringing signal of waveform (d) is the result of coupling $V_{BAT}$ to L2 at switch point 1430 and the differential ringing signal is derived from an inverted L2(t).

Figure 10:
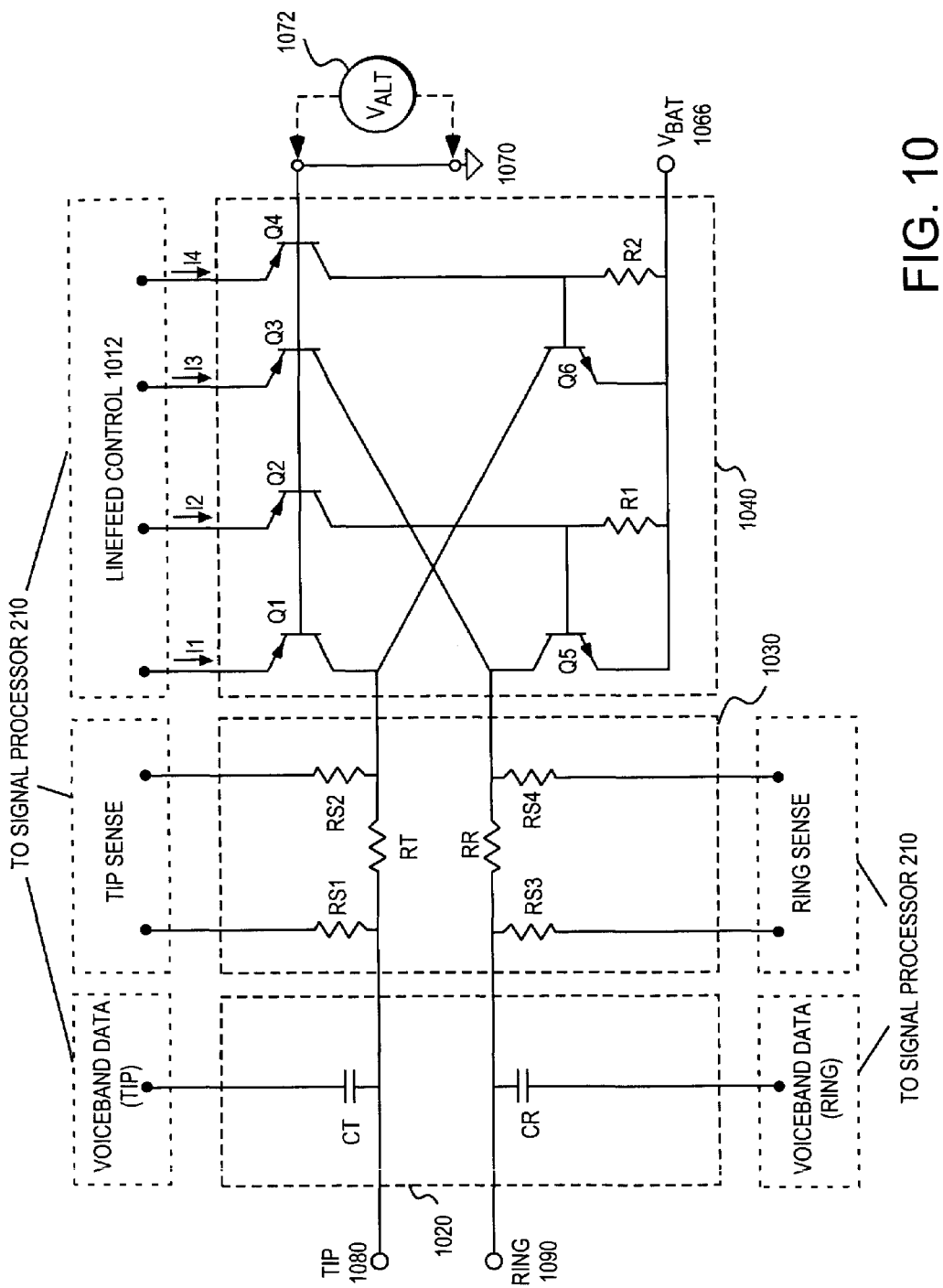
FIG. 10 illustrates one embodiment of a linefeed driver.

FIG. 10 illustrates one embodiment of a linefeed driver suitable for driving the subscriber line using either a linear mode or a switch mode. The linefeed driver includes a voice data portion 1020, sense portion 1030, and power portion 1040. Voice data portion 1020 provides voiceband data from the subscriber line to the signal processor. Voice data communicated from the signal processor to the subscriber line may be superimposed on at least some of the control signals I1–I4 controlling the power portion of the linefeed driver. Sense portion 1030 allows the signal processor to monitor the tip and ring line conditions, for example, to detect when subscriber equipment is on-hook or off-hook as well for ensuring the appropriate power levels are provided to tip 1080 and ring 1090. The power portion 1040 includes a plurality of transistors Q1–Q6 that drive the tip and ring lines in accordance with the linefeed control signals 1012 provided by the signal processor. Linefeed control is provided in the form of control currents I1–I4.

Transistors Q1, Q4, and Q6 control the tip line. Transistors Q2, Q3, and Q5 control the ring line. During the on-hook and off-hook operational states, transistors Q1–Q6 are operated in their linear regions of operation. During the ringing state, however, the control signals applied by the signal processor force transistors Q1, Q6 and Q3, Q5 to operate in cut-off and saturation regions of operation so that these transistors operate as switches or multiplexers selectively coupling either $V_{BAT}$ 1066 or ground 1070 to the tip 1080 and ring 1090 lines. An alternate pre-determined supply level 1072 may be used in lieu of ground 1070 to permit toggling between $V_{BAT}$ and the alternate supply level 1072.

The direct drive method results in a differential ringing signal comparable to that produced by traditional balanced or unbalanced ringing. Similar to the traditional balanced ringing technique, however, this direct drive approach permits driving each of the tip and ring lines such that each provides approximately one-half of the entire signal swing required for ringing. The direct drive method may be used in conjunction with other waveforms to produce differential ringing signals having non-sinusoidal shapes (e.g., trapezoidal, triangular, etc.).

Referring to FIG. 9, the illustrated small signal waveform 942 resembles a rectified sine wave wherein rectification occurs at the sine wave mean value of zero. $V_{942}=|B \sin(wt)|$ where B is the sine wave peak voltage. The sine wave B sin(wt) is thus folded onto itself about the folding point zero to produce $|B \sin(wt)|$.

In one embodiment, $V_{BAT}$ is of the form $V_{BAT}=A|B \sin(wt)|+D$, where D is the supply offset introduced by the power supply and A is the amplification factor of the power supply. The resulting $V_{BAT}$ waveform is switched between the tip and ring lines to generate two waveforms for the purpose of driving the tip and ring lines. The folded ringing technique may be generalized to allow for the ringing signal components to contribute a DC component to the differential ringing signal.

Referring to FIG. 9, any DC offset present in the small signal waveform $V_{942}$ is irrelevant and will not be amplified by the switching power supply 930. Thus an input signal 942 of the form $V_{942}=|B \sin(wt)+C|$ or $V_{942}=|B \sin(wt)+C|-C$ will produce the same $V_{BAT}$. A DC offset (independent of any supply offset provided by the power supply) can be introduced into the differential ringing signal as a result of the modification to the AC component of the small signal waveform 942. In particular, modification of the AC component by selecting folding points other than the mean of the pre-folded AC component will introduce a DC component into the differential ringing signal.

Figure 11:
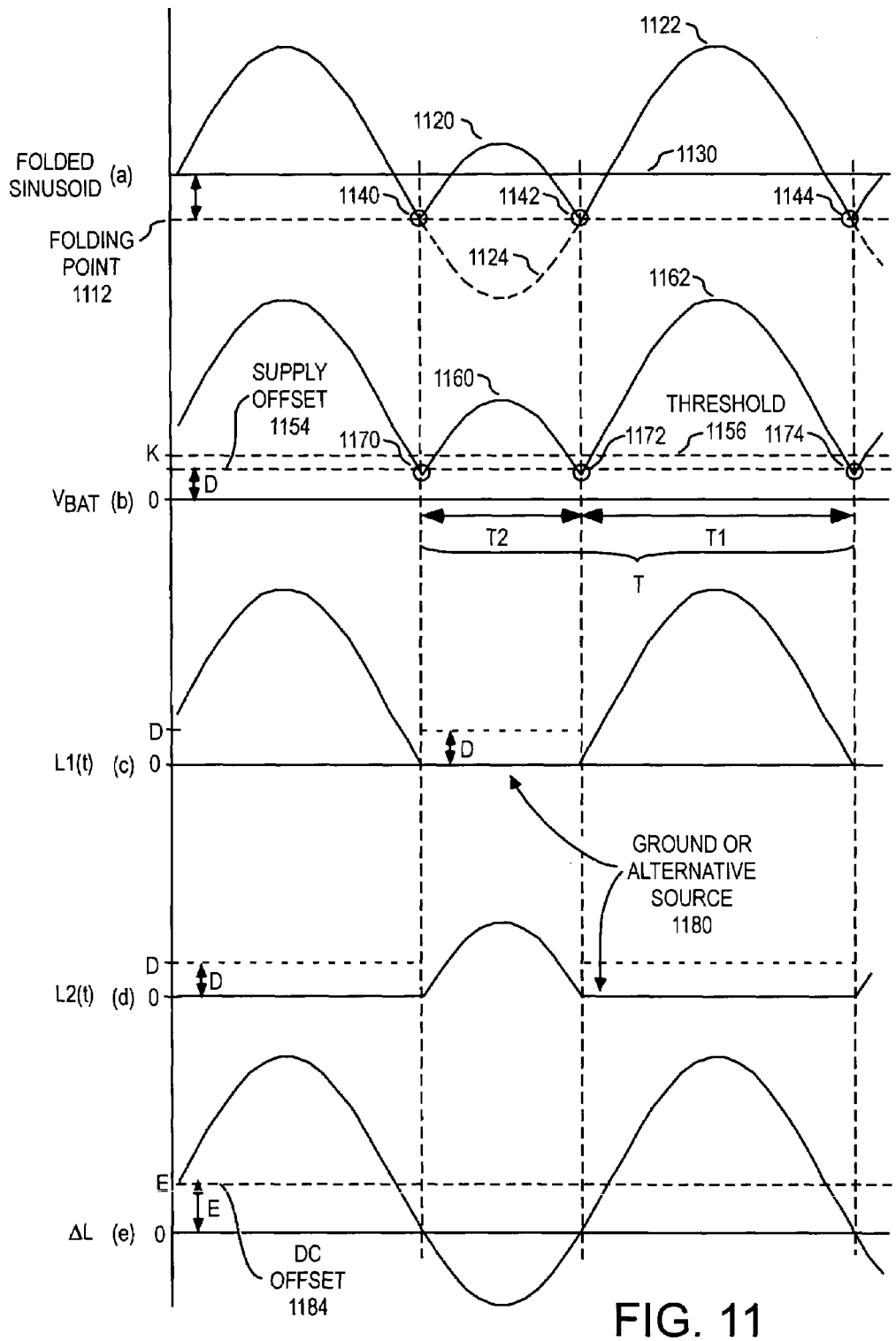
FIG. 11 illustrates one embodiment of a rectified waveform for generating the differential ringing signal with a DC offset.

FIG. 11 illustrates one embodiment of a $V_{BAT}$ waveform corresponding to a waveform, f(t), rectified or folded about a value other than its mean, $\overline{f(t)}$. For periodic f(t) with period T, $$\overline{f(t)} = \frac{1}{T}\int_0^T f(t).$$

Generally, rectification of any waveform, f(t) about a value C can be defined as follows:

$$f_{RECT}(t) = \begin{cases} f(t) & \text{for } f(t) \geq C \\ C - f(t) + C & \text{for } f(t) < C \end{cases}$$

This rectified waveform is amplified and translated by the power supply to produce $V_{BAT}$. With a switching power supply, however, the extremes of $F_{RECT}(t)$ correspond to the extremes of $V_{BAT}$. Thus translation of $f_{RECT}(t)$ by C to provide $$f_{RECT}(t) = \begin{cases} f(t) - C & \text{for } f(t) \geq C \\ C - f(t) & \text{for } f(t) < C \end{cases}$$

will have no effect on the power supply output $V_{BAT}$. When C=0, the expression for $f_{RECT}(t)$ reduces to the well-known expression for a rectified waveform:

$$f_{RECT}(t)|_{C=0} = \begin{cases} f(t) & \text{for } f(t) \geq 0 \\ -f(t) & \text{for } f(t) < 0 \end{cases} = |f(t)|$$

Given that the power supply amplifies only the AC component of f(t), $f_{RECT}(t)$ is referred to as "zero folded" whenever $C=\overline{f(t)}$ (i.e., the mean of f(t)). For periodic f(t) of period T having the property that $f(t)-\overline{f(t)}=\overline{f(t)}-f(t+T/2)$, zero folding ensures that no DC component is introduced into the differential ringing signal by $f_{RECT}(t)$. This would be the case, for example, with simple sinusoidal, trapezoidal, triangular, and sawtooth waveforms.

If f(t) is a sinusoid of period T, for example, zero-folding produces a $V_{BAT}$ resembling a full-wave rectified sinewave of period T/2 and a differential ringing signal of period T having no DC component introduced by the AC component of $f_{RECT}(t)$. Zero-folding, however, is a special case that ensures that the same DC component is introduced into both ringing signal components such that there is no DC component in the differential ringing signal. A mismatch in the ringing signal components can be used to deliberately create a non-zero differential ringing signal DC component distinct from any offset contributed by the power supply. This mismatch is introduced through the use of non-zero folding.

Although "folding" has been discussed with respect to the power supply input, the power supply output W(t) may be generated in a variety of ways. A folding line may be identified by a plurality of critical points at which the slope of the waveform W(t) abruptly changes sign. This line may occur at a value D other than zero due to the introduction of an offset by the power supply. D represents either a maximum or minimum extreme of W(t).

Referring to FIGS. 9 and 11, the signal processor controls the tip multiplexer to couple the power supply to the tip line for the duration T1 while controlling the ring multiplexer to couple the ring line to the alternate source. The signal processor then controls the tip multiplexer to couple the tip line to the alternate source while controlling the ring multiplexer to couple the ring line to the power supply output for the duration T2. The period of the ring line, tip line, and differential ring signal waveforms is T=T1+T2. If T1=T2, then the period of $V_{BAT}$ is T/2. If T1≠T2, then the period of $V_{BAT}$ is T.

In the illustrated embodiment, at least one of the ringing signal components is time-varying over the interval between any two critical points. Thus for t∈(0,T2) there is some point t=z for which the derivative of at least one of L1(t) and L2(t) is non-zero. In other words, there exists some z∈(0,T2) such that either $$\frac{d}{dt}L1(t)\bigg|_{t=z} \neq 0 \text{ or } \frac{d}{dt}L2(t)\bigg|_{t=z} \neq 0.$$

Similarly, there is some point z∈(0,T1) such that either $$\frac{d}{dt}L1(t)\bigg|_{t=z} \neq 0 \text{ or } \frac{d}{dt}L2(t)\bigg|_{t=z} \neq 0.$$

Figure 12:
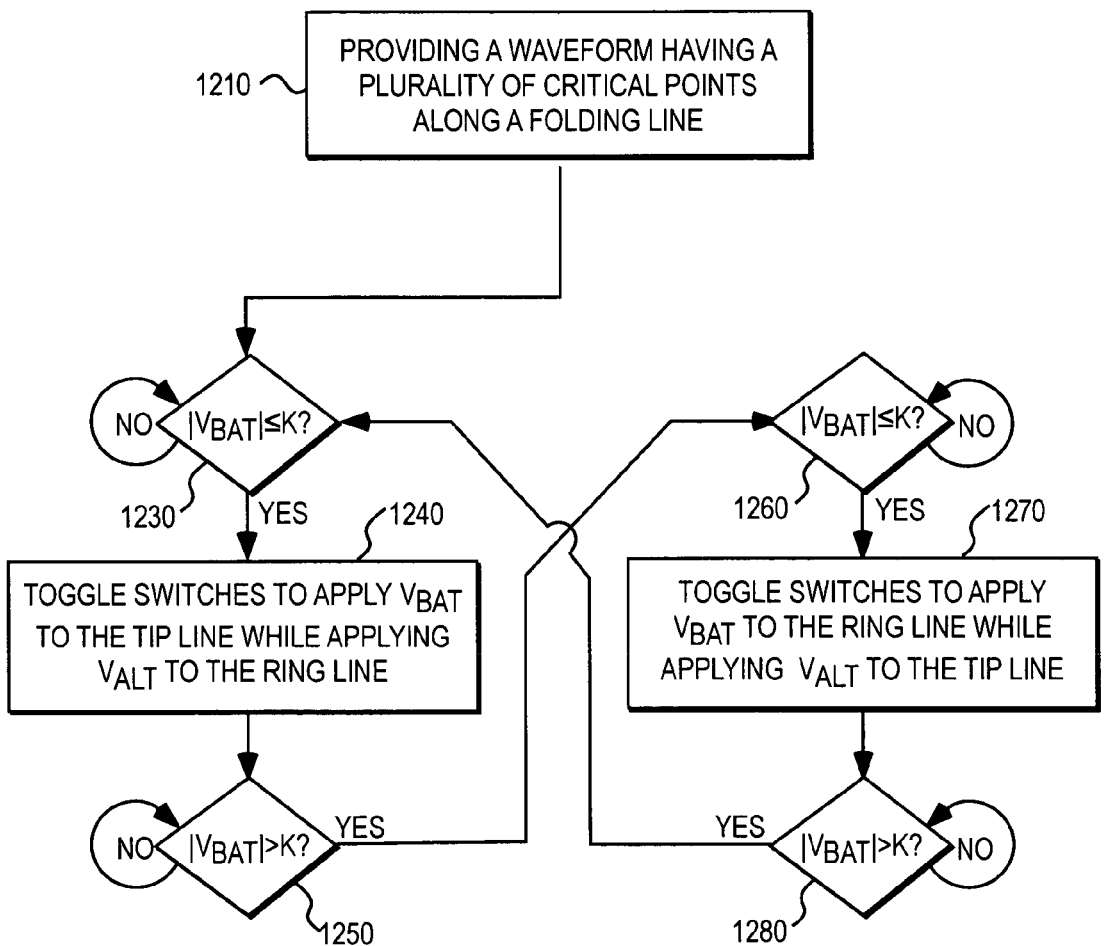
FIG. 12 illustrates a method of toggling switching circuitry in response to power supply inflection points along a folding line to generate a differential ringing signal.

FIG. 12 illustrates a generalized method for generating a differential ringing signal between the tip and ring lines. A power supply is coupled to a linefeed driver for driving the tip and ring lines. During the on-hook and off-hook states, the linefeed driver is operated as a linear amplifier. During the ringing state, however, the linefeed driver is operated as switching circuitry. The active devices of the linefeed driver are controlled to selectively couple the tip and the ring lines to either the power supply or an alternate source.

In step 1210, a first waveform exhibiting rectification is provided. Rectification is typified by a plurality of critical points located at a minimum or maximum extreme of the waveform. These critical points follow a line of folding that represents folding of a waveform about a folding point. Although rectification is typically presumed to be about the folding point zero such that $F_{RECT}(t)=|f(t)|$, rectification may occur about a non-zero rectification point such that $f_{RECT}(t)=|f(t)-C|+C$, where C is non-zero. In various embodiments, $f(t)$ is a sinusoidal or trapezoidal waveform. In one embodiment, $f(t)$ is periodic with period T and "balanced" in time such that $f(t)=-f(t+T/2)$.

Figure 13:
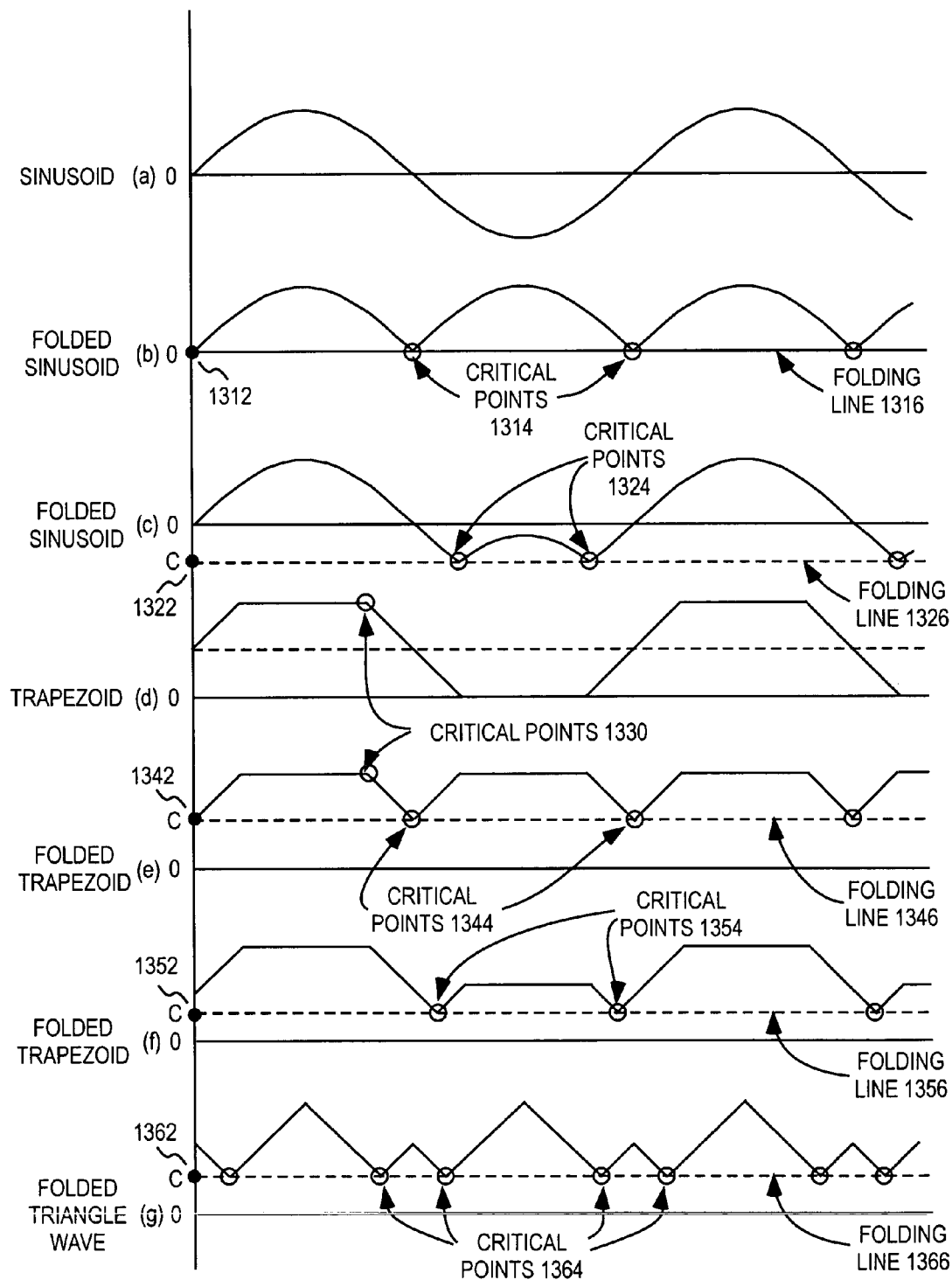
FIG. 13 illustrates a plurality of rectified waveforms.

FIG. 13 illustrates rectification of a variety of waveforms about their means or values other than their means. Sinusoid waveform (a) is illustrated without any DC offset and thus has a mean value of zero. Waveform (b) illustrates rectification of sinusoid (a) about 0 (folding point 1312). The folding operation results in a plurality of critical points 1314 lying on the same folding line 1316 defined by the folding point 1312. In the illustrated embodiment, the critical points of waveform (b) are equidistant. The period of waveform (b) is half that of the period of waveform (a).

Waveform (c) illustrates folding waveform (a) about a folding point other than zero. Although the mean is zero, the folding point 1322 is less than zero (i.e., C<0). A plurality of critical points 1324 is exhibited along the folding line 1326 defined by the folding point 1322. In this case, the critical points are not equidistant. Moreover, the period of waveform (c) is the same as that of waveform (a). Given a duration T1 between a first and an adjacent second critical point on the folding line 1326 and a duration T2 between the second and the next adjacent critical point along the folding line, the period T of the folded sinusoid is calculated as T=T1+T2. Clearly, for a waveform having more critical points within the period, T may be decomposed into more individual components, T1, T2, ... $T_n$.

Waveform (d) illustrates a trapezoidal waveform comprising critical points before rectification. Waveform (d) also exhibits a non-zero mean or DC offset. Waveform (e) illustrates folding waveform (d) about folding point 1342 to generate a folded trapezoid waveform. In this example, critical points 1330 of the trapezoidal waveform (d) are preserved through rectification. Rectification generally increases the number of critical points in the waveform being rectified.

Waveform (d) has a mean of C. Folding waveform (d) about C produces a rectified waveform (e) that exhibits a period one-half that of waveform (d). Rectification introduces additional critical points 1344 along the folding line 1346 defined by the folding point 1342. Although switching occurs near critical points for the ringing application, the switching is controlled by the critical points 1344 along the folding line 1346 rather than other critical points 1330.

Waveform (f) illustrates folding a trapezoidal waveform having a DC offset about a folding point 1352 other than the DC offset. The resulting waveform exhibits non-equidistantly spaced critical points 1354 along the folding line 1356 defined by the folding point 1352.

Waveform (g) illustrates folding a triangular waveform having a DC offset about a folding point 1362 other than the DC offset. The critical points 1364 occurring along the folding line 1366 are non-equidistantly spaced.

Referring back to step 1210 of FIG. 12, the folded nature of the rectified waveform results in a periodic series of critical points. The duration between a first critical point and a second critical point along the folding line is T1. The duration between the second critical point and a third critical point is T2. A period, T, of the rectified waveform in this case does not exceed T1+T2, i.e., T≦T1+T2.

A translated AC component of the rectified waveform is amplified to generate the power supply output, $V_{BAT}$ in step 1220. $V_{BAT}$ may also include a supply offset, D, such that $V_{BAT}=A(F_{RECT}(t)-C)+D=A(|f(t)-C|)+D$.

When in the ringing state, the linefeed driver behaves as switching circuitry to switch the tip and ring lines between a first state and a second state. In the first state, the switch circuitry is controlled to couple the tip line to the power supply while coupling the ring line to an alternate source. In the second state, the switch circuitry is controlled to couple the tip line to the alternate source while coupling the ring line to the power supply output.

The switch circuitry is toggled from one state to a distinct other state each time $V_{BAT}$ exhibits a critical point. In one embodiment, $V_{BAT}$ is determined to be near a critical point when a magnitude of $V_{BAT}$ is less than or equal to a pre-determined switching threshold, K (i.e., $|V_{BAT}|\leq K$).

Step 1230 determines if $|V_{BAT}|\leq K$. If not, the switches remain in their current state. Once $|V_{BAT}|\leq K$ (i.e., indicating that a critical point is near or has been reached), step 1240 toggles the switches to the first state in which $V_{BAT}$ is applied to the tip line while an alternate source, $V_{ALT}$ is applied to the ring line. Step 1250 is provided to prevent re-toggling of the switches near the current critical point by disabling further processing until $|V_{BAT}|>K$ again. Once $|V_{BAT}|>K$, the conditions for toggling do not occur until the next critical point and processing continues with step 1260.

Step 1260 determines whether the next critical point has been reached. The switches remain in their current state until $|V_{BAT}|\leq K$. Once $|V_{BAT}|\leq K$ (i.e., indicating that the next critical point has been reached), step 1270 toggles the switches to the second state in which $V_{BAT}$ is applied to the ring line while $V_{ALT}$ is applied to the tip line. Step 1280 is provided to prevent re-toggling of the switches near this inflection point by disabling further processing until $|V_{BAT}|>K$ again. Once $|V_{BAT}|>K$, the conditions for toggling do not occur until the next critical point. The process continues by repeating steps 1230–1280.

The result is that the switch circuitry couples $V_{BAT}$ to the tip line while coupling $V_{ALT}$ to the ring line upon reaching a first $V_{BAT}$ critical point and toggling to the first state. The switch circuitry remains in the first state for the duration T1 until a second $V_{BAT}$ critical point is reached. Upon reaching the second $V_{BAT}$ inflection point, the switch circuitry is toggled to the second state in which $V_{BAT}$ is coupled to the ring line while $V_{ALT}$ is coupled to the ring line. The switch circuitry remains in the second state for the duration T2 until the next $V_{BAT}$ critical point is reached and the process repeats by toggling the switch circuitry back to the first state. In one embodiment, $V_{ALT}=0$ such that the alternate source is ground. In another embodiment, the alternate source has a same value as the supply offset such that $V_{ALT}$ is not grounded (i.e., $V_{ALT}=D$).

The period of the resulting differential ringing signal as well as the tip and ring components of the differential ringing signal is T=T1+T2. When T1≠T2, the period of $V_{BAT}$ is also T. If on the other hand, T1=T2 then the period of $V_{BAT}$ is T1=T2=T/2.

When T1≠T2, the method of generating the differential ringing signal introduces a DC offset into the differential ringing signal. This DC offset is distinct from any supply offset, D, contributed by the power supply. Indeed given that D is introduced to both the tip and ring lines, D will have no effect on the differential ringing signal if $V_{ALT}$=D. The DC offset in the differential ringing signal is a function of the folding point about which a non-rectified waveform is folded to generate $V_{BAT}$ as well as the shape of the non-rectified waveform itself.

Mathematically, the differential ringing signal is derived from the time-varying power supply of which the differential ringing signal is a component. Note that the expression for a rectified waveform includes the desired differential ringing signal. In particular, a time-varying power supply of the form W(t)=|f(t)−C|+C+D.

Referring to FIG. 9, various components of the SLIC may be incorporated into one or more integrated circuit packages. In one embodiment, the signal processor and portions of the switching power supply 930 are incorporated onto one or more semiconductor dice within a common integrated circuit package. In one embodiment, for example, signal processor 910, and portions of the power supply 930 including comparator 940 and saw tooth generator 944 are fabricated on a same semiconductor substrate 970 within a single integrated circuit package. In one embodiment, these components are implemented as a complementary metal oxide semiconductor (CMOS) integrated circuit.

When operated as switching circuitry rather than a linear amplifier, the linefeed driver consumes little power and therefore dissipates little heat. Thus switching circuitry 920 is suitable for fabricating on a semiconductor substrate of an integrated circuit.

The linefeed driver 920 may be implemented as discrete components as illustrated in FIG. 10. Alternatively, at least the power portion of the linefeed driver may be implemented as an integrated circuit. The power portion of the linefeed driver may be fabricated as a high voltage integrated circuit residing on a common semiconductor substrate within a single integrated circuit package.

Methods and apparatus for generating a ringing signal have been described. A power supply generates a rectified waveform. The rectified waveform has an AC component corresponding to a balanced waveform folded about a folding point. The power supply output waveform has a plurality of critical points along the folding point. The supply output is provided to a linefeed driver operating in a switch mode when in a ringing state. The linefeed driver switching effectively decomposes the power supply waveform into a plurality of waveforms for application to the tip and ring lines. The linefeed driver switching is toggled by the critical points along the folding line defined by the folding point.

Upon encountering a critical point, the switches are toggled to a first state to couple the power supply to the tip line while applying an alternate source to the ring line. The switches remain in the first state for the duration T1 until encountering the next critical point lying on a same folding line. The switches are then toggled to a second state to couple the power supply to the ring line while applying the alternative source to the tip line. The switches remain in the second state for the duration T2 until encountering the next critical point. The period of the differential ringing signal is T1+T2=T.

When the folding point is zero and the waveform has the property that V(t)=−V(t+T/2) before rectification, the critical points used for toggling are equidistant. The power supply provides a waveform having a period T/2 that substantially resembles a full-wave rectified waveform. The waveforms appearing on the tip and ring lines resemble half-wave rectified waveforms having a 180° relative phase difference and a period T. No DC offset is introduced into the differential ringing signal. Thus $\int_0^T \Delta L(t) \approx 0$.

When the folding point is nonzero, T1≠T2, the power supply output waveform provides a periodic waveform having a period T=T1+T2. The critical points used for toggling are not equidistant, thus resulting in a DC offset introduced into the differential ringing signal. Thus $\int_0^T \Delta L(t) \neq 0$.

Examined from another perspective, the ringing signal components L1(t), L2(t) are derived from the time varying power supply W(t)=|f(t)−C|+C+D, where D is a DC offset contributed by the power supply. C is a folding line about which f(t) is folded. The differential ringing signal ΔL(t)= L1(t)−L2(t). The signal processor controls the linefeed driver to toggle between 1) coupling W(t) to L1 (e.g., the tip line) while coupling L2 (e.g., the ring line) to an alternate supply, $V_{ALT}(t)$, and 2) coupling W(t) to L2 while coupling L1 to $V_{ALT}(t)$.

The toggling occurs when W(t)≦K, wherein K is a pre-determined switching threshold near critical points of W(t). K is selected such that a first toggling occurs at $W(t_1+\epsilon_1)$ and a second toggling occurs at $W(t_2+\epsilon_2)$, wherein $W(t_1)$ and $W(t_2)$ are critical points of W(t). In one embodiment, $|\epsilon_1|, |\epsilon_2|$ are small relative to the time Δt between $t_1$ and $t_2$. In particular, $|\epsilon_1|, |\epsilon_2| << \Delta t = |t_1 - t_2|$.

A DC bias, E, can be introduced into the differential ringing signal such that ΔL(t)=f(t)+E from a time-varying supply level of the form W(t)=|f(t)−C|+C+D. For f(t) of period T with the property f(t)=−f(t+T/2), this is readily achieved by selecting a non-zero C In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of generating a subscriber line ringing signal for a subscriber line having first and second lines, comprising:
   a) applying a time-varying supply level W(t)=|f(t)−C|+C+D to the first line while applying an alternate source $V_{ALT}(t)$=D to the second line when f(t)−C>0, wherein D is a supply level DC offset, wherein C is a folding line about which f(t) is folded, wherein C≠0; and
   b) applying the time-varying supply level to the second line while applying the alternate source to the second line when f(t)−C≦0, wherein a resulting ringing signal component of the first line is L1(t), wherein a resulting ringing signal component of the second line is L2(t), wherein the first and second lines form a differential ringing signal line pair providing the differential ringing signal ΔL(t)=L1(t)−L2(t)=f(t).

2. The method of claim 1 wherein D=0.

3. The method of claim 1 wherein f(t) is periodic with period T, wherein $$\frac{1}{T}\int_0^T \Delta L(t) = \overline{L(t)} \neq 0.$$

4. The method of claim 1 wherein W(t)=L1(t)+L2(t).

5. The method of claim 1 wherein steps a) and b) are initiated near critical points of W(t) when W(t)−K=0, wherein K is a pre-determined switching threshold, wherein step a) is initiated near a first critical point W($t_1$) at W($t_1$+$\epsilon_1$), wherein step b) is initiated near a subsequent second critical point W($t_2$) at W($t_2$+$\epsilon_2$), wherein |$\epsilon_1$|, |$\epsilon_2$|<<Δt=|$t_1$−$t_2$|.

6. An apparatus for generating a subscriber line ringing signal, comprising:
   a power supply providing a time-varying supply level W(t)=|f(t)−C|+C+D, wherein D is a power supply offset, wherein C≠0;
   a linefeed driver; and
   a signal processor, wherein when W(t)≦K the signal processor controls the linefeed driver to toggle between 1) coupling W(t) to a tip line while coupling a ring line to an alternate supply, $V_{ALT}$(t), and 2) coupling W(t) to the ring line while coupling the tip line to $V_{ALT}$(t), wherein K is a pre-determined switching threshold.

7. The apparatus of claim 6 wherein D=0.

8. The apparatus of claim 6 wherein f(t) is periodic with period T, wherein $$\frac{1}{T}\int_0^T \Delta L(t) = \overline{L(t)} \neq 0.$$

9. The apparatus of claim 6 wherein K is selected such that the toggling occurs near critical points of W(t), wherein a first toggling occurs at W($t_1$+$\epsilon_1$), wherein a second toggling occurs at W($t_2$+$\epsilon_2$), wherein W($t_1$) and W($t_2$) are critical points of W(t), wherein |$\epsilon_1$|, |$\epsilon_2$|<<Δt=|$t_1$−$t_2$|.

10. A method of generating a differential ringing signal with a DC component between a tip and a ring line of a subscriber line, comprising:
   a) providing a time-varying supply level, W(t), having a plurality of critical points along a folding line, wherein the critical points are substantially not equidistant;
   b) coupling W(t) to the tip line while coupling an alternate source to the ring line in response to a first critical point; and
   c) coupling W(t) to the ring line while coupling the alternate source to the tip line in response to a second critical point.

11. The method of claim 10 wherein the differential ringing signal has a period T, wherein a duration between the first and second critical points is T1, wherein a duration between the second and a next critical point is T2, wherein T≧T1+T2.

12. The method of claim 10 wherein T1≠T2, wherein a period of W(t) is T=T1+T2.

13. The method of claim 10 wherein the differential ringing signal is one of a sinusoidal, a trapezoidal, a sawtooth, and a triangular waveform.

14. An apparatus for generating a subscriber line differential ringing signal having a DC component between a tip line and a ring line, comprising:
   switch circuitry coupling the tip line to a time-varying power supply W(t) having a plurality of non-equidistantly spaced critical points while coupling the ring line to an alternate source when in a first state, wherein the switch circuitry couples the tip line to the alternate source while coupling the ring line to W(t) when in a second state; and
   a signal processor toggling the switch circuitry between the first and second states in response to the critical points.

15. The apparatus of claim 14 wherein the switch circuitry is toggled to the first state in response to a first critical point, wherein the switch circuitry is toggled to the second state in response to a second critical point.

16. The apparatus of claim 15, wherein a duration between the first and second critical points is T1, wherein a duration between the second critical point and a next critical point is T2, wherein the differential ringing signal has a period T≧T1+T2.

17. The apparatus of claim 16, wherein the differential ringing signal has a period T=T1+T2.

18. The apparatus of claim 14 wherein W(t) resembles one of a full-wave rectified sinusoidal and a full-wave rectified trapezoidal waveform.

19. A method of generating a differential ringing signal, comprising:
   a) applying a ringing signal component L1(t) to the tip line; and
   b) applying a ringing signal component L2(t) to the ring line, wherein L2(t)≠L1(t+T/2), wherein L1(t) and L2(t) have a period of T, wherein at least one of L1(t) and L2(t) varies over the interval t∈(0,T/2), wherein the differential ringing signal ΔL(t)=L1(t)−L2(t).

20. The method of claim 19 wherein step a) further comprises:
   i) applying a time-varying supply level W(t) to the tip line for a duration T1; and
   ii) applying an alternate supply level to the tip line for a duration T2, wherein T1≠T2.

21. The method of claim 20 wherein step b) further comprises:
   i) applying the alternate supply level to the ring line while applying W(t) to the tip line for the duration T1; and
   ii) applying W(t) to the ring line while applying the alternate supply level to the tip line for the duration T2.

22. The method of claim 20 wherein step i) is initiated when W(t) is near a first critical point, wherein step ii) is initiated when W(t) is near a subsequent second critical point.

23. An apparatus for generating a subscriber line ringing signal, comprising:
   a power supply providing a time-varying supply level W(t) having a plurality of non-equidistantly spaced critical points along a same folding line;
   a linefeed driver; and
   a signal processor controlling the linefeed driver to couple W(t) to a tip line while maintaining a ring line at a pre-determined supply level when in a first state, wherein the signal processor controls the linefeed driver to couple W(t) to the ring line while maintaining the ring line at the pre-determined supply level in a second state, wherein a resulting ringing signal component of the tip line is L1(t), wherein a resulting ringing signal component of the ring line is L2(t), wherein a differential ringing signal ΔL(t)=L1(t)−L2(t) has a period T.

24. The apparatus of claim 23 wherein the differential ringing signal is one of a sinusoidal, a trapezoidal, a sawtooth, and a triangular waveform.

25. The apparatus of claim 23 wherein the signal processor toggles the linefeed driver between the first and second states in response to the critical points.

26. The apparatus of claim 23 wherein the coupling of W(t) to a selected one of the tip and ring lines is initiated when |W(t)|≦K, wherein |W(t)| is an absolute value of W(t), wherein K is a pre-determined switching threshold.

27. The apparatus of claim 23 wherein the pre-determined supply level is ground.

28. The apparatus of claim 23 wherein $L1(t)$ and $L2(t)$ resemble one of a half-wave rectified sinusoidal and a half-wave rectified trapezoidal waveforms.

29. The apparatus of claim 23 wherein $W(t)$ resembles one of a full-wave rectified sinusoid and a full-wave rectified trapezoid.

* * * * *